Dec. 23, 1969         TOSHIO HIRATA ETAL         3,485,095
           APPARATUS FOR EXAMINING CONDITIONS OF FILAMENTS AND
                    YARNS RUNNING AT HIGH SPEED
Filed Dec. 19, 1967                              3 Sheets-Sheet 1
FIG. 1
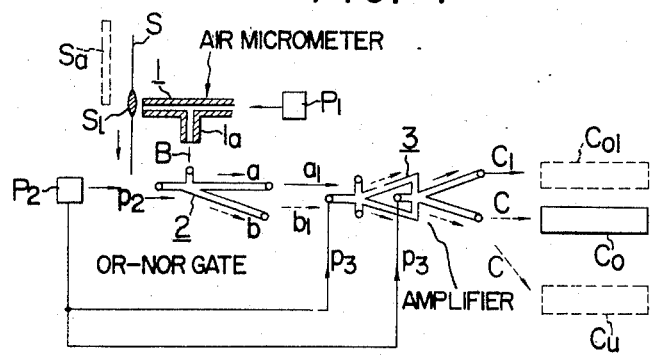
FIG. 2
OPPOSED NOZZLE TYPE DETECTOR
FIG. 3
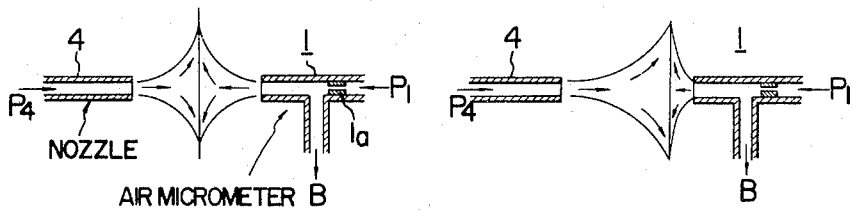
FIG. 4
FIG. 5
MODIFIED OPPOSED NOZZLE TYPE DETECTOR
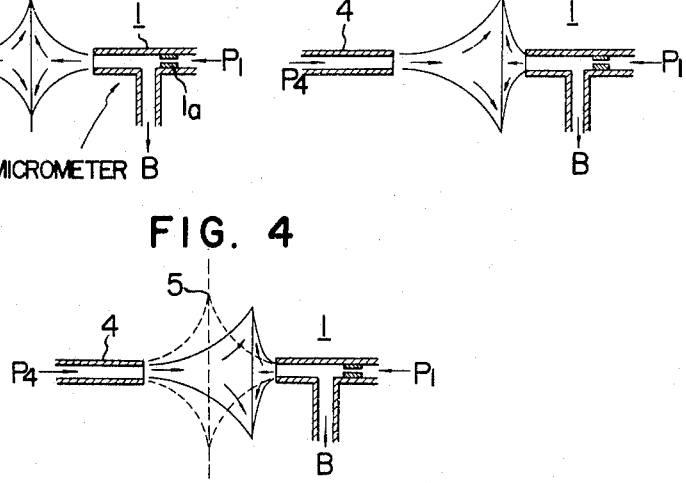
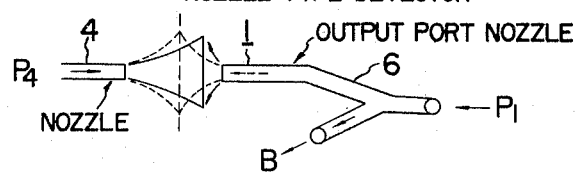

Dec. 23, 1969  TOSHIO HIRATA ET AL  3,485,095
APPARATUS FOR EXAMINING CONDITIONS OF FILAMENTS AND
YARNS RUNNING AT HIGH SPEED
Filed Dec. 19, 1967  3 Sheets-Sheet 2

RESISTIVITY DETECTOR

MODIFICATION OF RESISTIVITY DETECTOR

MULTI-OPPOSED NOZZLE TYPE DETECTOR

FIG. 13
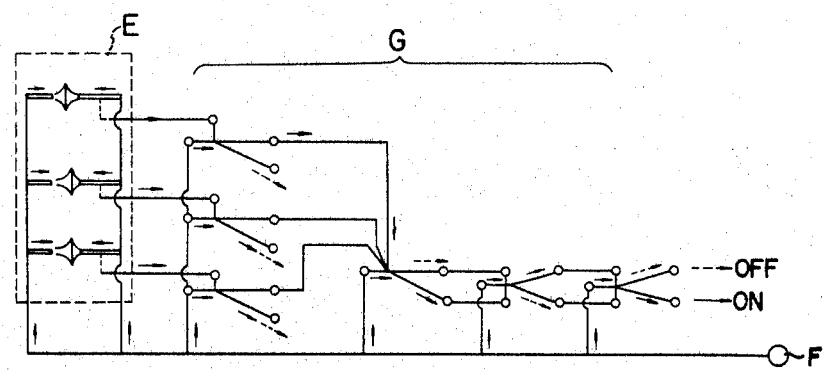
FIG. 14    FIG. 15    FIG. 16
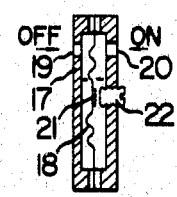 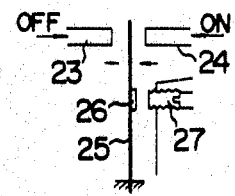 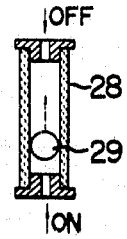
FIG. 17
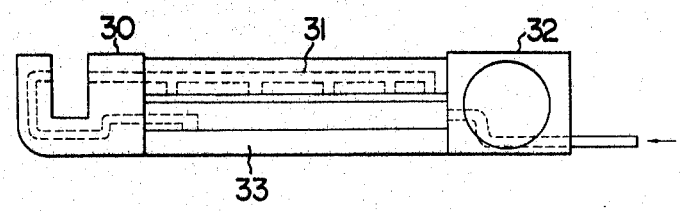
FIG. 18
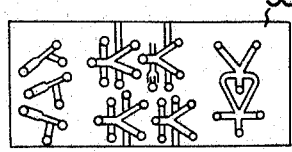

United States Patent Office 3,485,095
Patented Dec. 23, 1969

3,485,095
APPARATUS FOR EXAMINING CONDITIONS OF FILAMENTS AND YARNS RUNNING AT HIGH SPEED
Toshio Hirata, Tashiro Arai, and Kazuhide Yamaguchi, Tokyo-to, Japan, assignors to Tokyo Koku Keiki Kabushiki Kaisha, Tokyo-to, Japan
Filed Dec. 19, 1967, Ser. No. 691,849
Claims priority, application Japan, Jan. 10, 1967, 42/1,909; Feb. 17, 1967 (utility models), 42/13,499, 42/13,500; Mar. 9, 1967, 42/14,838; Oct. 14, 1967 (utility model), 42/87,214
Int. Cl. G01l 5/04
U.S. Cl. 73—160   4 Claims

ABSTRACT OF THE DISCLOSURE

Abnormal conditions of filaments, yarns and like materials of fine thickness are examined by a fluidics detector system through which the material is passed at high speed to develop a column of an accompanying air stream therearound with a fluid pressure signal being generated in response to abnormal conditions of the material as detected on the basis of the fluid column and the signal is utilized to actuate a fluid pressure control system embodying fluid pressure logical elements for indicating such abnormal conditions.

---

This invention relates to an apparatus for examining conditions of filaments and yarns, and more particularly to an apparatus for detecting breakage, irregularity, and other abnormal conditions of a thread or other like materials.

For example, the quality of woven fabrics is mainly determined by the quality of the filaments, stranded fibers, yarns or threads and any breakage or abnormal condition of these raw materials impairs the quality of the products. Therefore, it has been the practice to provide a photoelectric converter type yarn cleaner for a winder to detect and remove breakage or other abnormal conditions as, for example, a slub. In an ordinary photoelectric converter type yarn cleaner, a thread (for brevity the term "thread" herein used includes any continuous thread-like material such as natural or artificial filaments, stranded fibers, yarns or the like) is passed to intercept a light beam to vary the quantity of light received by a proto-electric cell to vary the output therefrom which is used to operate a counter or a thread cutter. However, if such a detector was to be installed in an atmosphere which causes dust to accumulate on a light source and/or photoelectric cell, the function of the photo-lectric conversion would be impaired. Thus, for example, when artificial filaments are being spun from a spinning solution, vapor of an acid or alkali or a mist of oil or water fills the room, and when natural fibers are being spun, dust fills the room, so that a photoelectric converter type yarn cleaner cannot be used in such an environment. For this reason, at present, conventional yarn cleaners are not used to detect abnormal conditions of filaments or yarns, for example, slubs or breakages of yarns, but they are utilized to detect and remove only slubs of stranded fibers or yarns. Even in the latter case, however, dust is created when the yarns are taken up by winders, thus requiring frequent cleaning.

Further, in the manufacture of artificial filaments, in addition to the problem of detecting and removing slubs, the problem of treating broken filaments is very important. Since a large number of filaments are treated in parallel in a textile plant, development of an effective breakage detecting mechanism has long been desired in the art, especially from the viewpoint of economy.

In addition to the detection of abnormal conditions or breakage of elongated material such as thread, metal wire or rod, photoelectric detectors have been used in many applications including detection or controlling of the positions or configurations of plates or strips. In these applications, also, the accumulation of dust or mist on a light source and/or a photoelectric cell causes the same problem as mentioned hereinabove.

It is therefore an object of this invention to provide a novel examining or detecting apparatus which can obviate the above mentioned problems by using a fluidics system.

Another object of this invention is to provide a novel combination of a fluidics detector and a fluid pressure controlled system including fluid pressure logical elements which can examine or detect conditions of various materials and indicate or control such conditions.

The novel features which characterize this invention are set forth with particularity in the appended claims. The invention itself, however both as to its organization and method of operation together with further objects and advantages thereof may best be understood by reference to the following description taken in connection with the accompanying drawings in which:

FIG. 1 is a diagram of a fluid pressure examining apparatus including an air micrometer and a fluid controlled logical element embodying the principle of this invention;

FIGS. 2, 3 and 4 show an opposed nozzle type detector in various operating conditions;

FIG. 5 is a diagram to show a system wherein a modified opposed nozzle type detector is used as an output load to switch a flow of compressed air through a fluidics system;

FIG. 13 is a connection diagram of the novel apparatus comprising a detector unit and a fluid pressure controlled system comprising fluid pressure logical elements;

FIGS. 14 and 15 show two forms of fluid pressure switches;

FIG. 16 is a view in section of an indicator to be used in this invention;

FIG. 17 is a side elevation of a novel integral unit including a detector head, a fluid pressure controlled system, and a pressure switch; and FIG. 18 is a plan view of an element of the integral unit shown in FIG. 17.

Figure 6:
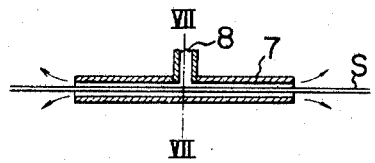
FIG. 6 is a longitudinal sectional view of a resistivity detector for producing fluid presure signals.

Referring now to FIG. 1 of the accompanying drawings, there is shown an air micrometer 1 of the back pressure type comprising a hollow tube. Air under pressure supplied from a source $P_1$ flows through the tube in the direction shown by an arrow, and a thread S to be examined is passed across the exit port of the air. When the diameter of the thread S is of a predetermined value, the back pressure of air micrometer 1 manifests a low constant value, but under an abnormal condition, for example, when a slub S1 of the thread passes across the exit port, free flow of air is precluded to momentarily increase the back pressure. This increased back pressure is taken out as a fluid pressure signal B through a branch pipe $1_a$ connected to the air micrometer. Signal B is supplied to a fluid controlled element 2 (OR-NOR element) to switch an air flow $p_2$ supplied from a source of pressurized air $p_2$ from a path $a$ to a path $b$. Upon decrease of the back pressure or disappearance of signal B, the air flow is switched back from path $b$ to path $a$, whereby the element 2 functions as an OR-NOR gate. In other words, when any abnormal condition such as a slub S1 passes by the air micrometer, a short pulse signal B corresponding to the increased back pressure is utilized to actuate the fluid controlled element 2 to provide another fluid pressure signal. A fluid pressure signal $b_1$ supplied through path $b$ is supplied to a fluid amplifier element 3 incorporated with a fluid pressure type flip-flop element, and supplied with a pressure air flow $p_3$.

When passing through the fluid amplifier as shown by the dotted line arrows, signal $b_1$ is successively subjected to switching, amplifying and shaping to provide an output signal C which is utilized to operate a counter Co, a cutter Cu, and an electric converter or an indicator.

While the above description refers to the detection of an abnormal condition of a thread, for example, a slub, where it is desired to detect breakage of the thread, the fact that the fluid pressure signal B is generated during the passage of thread S but disappears when breakage thereof occurs is utilized. More particularly, when thread S passes continuously, air flows through elements 2 and 3 as indicated by solid line arrows, but upon breakage of the thread, the fluid pressure signal B disappears. Thus, when fluid pressure signal B disappears in response to breakage of the thread, fluid flow $p_2$ passes through element 2 in the direction of arrow $a$ to produce a signal $a_1$ which is switched, amplified and shaped by the amplifier element 3, with the output signal C1 therefrom being used to operate a counter Co1, an electric converter, or an indicator.

As can be noted from the foregoing description, the novel apparatus for detecting an abnormal condition or breakage of a continuous thread and the like comprises a back pressure type air micrometer and a fluid controlled system acting as OR-NOR gates or logical circuits so that the interior and the air exit port of the air micrometer are always kept clean by the air current flowing therethrough. Further, the fluid pressure controlled system can be hermetically enclosed against the deleterious effect of dust, vapour and the like, as will be described later.

The apparatus shown in FIG. 1 can also be used as a position or configuration control means for a plate and the like. Thus, for example, when it is desired to accurately control the position of the lower edge of a plate S$a$, shown by dotted lines, the air micrometer 1 is positioned to direct its air stream toward said lower edge. Then, as long as the plate is maintained in the position shown, no back pressure is created, whereas when the lower edge is lowered beyond the exit port of the air micrometer, a back pressure is created thus creating a fluid pressure signal. Such an arrangement is also useful to maintain the plate at a predetermined distance from the air exit port of the air micrometer. Hence, a fluid pressure signal is generated whenever the distance between the plate and the air micrometer becomes less than a predetermined value. Such applications are found in steel mill plants where the position, width, thickness and the direction of travel of moving ingots, slabs, bars, plates or strips are required to be measured and controlled without their being touched under a severe environment. Since the novel apparatus utilizes pressurized fluid, preferably compressed air, as the operating medium and does not include any optical system or delicate electronic device, it can replace photoelectric devices operating under such severe conditions. The novel apparatus is sturdy, operates accurately and safely, has long life and is not affected by dust or vapor.

The embodiment shown in FIG. 1 has a limitation in that the thread must be passed close to the air exit port of the back pressure type air micrometer, but such a limitation may be obviated by utilizing a pair of opopsed nozzles through which air is ejected in opposite directions so that the ejected air streams impact with each other.

FIGS. 2, 3 and 4 show an opposed nozzle type detector and modified one wherein an air nozzle 4 is provided to oppose a back pressure type air micrometer 1 including a suitable orifice $1_a$. When it is assumed that $P_1$ and $P_4$ represent pressures of air flow supplied to air micrometer 1 and nozzle 4, respectively, and that the coefficients of ejection of both nozzles are equal, then if $P_1 = P_4$, air streams ejected from both nozzles will impact with each other at an intermediate point, so that air streams will spread outwardly in the form of circular discs along the plane of impact, as shown in FIG. 2. In this case, no back pressure is created on the side of air micrometer 1. Then, if $P_4$ and $P_1$ are so selected that $P_4 > P_1$, the plane of collision will approach the exit port of the air micrometer 1, in which case a back pressure is created in the air micrometer 1, thus producing signal B as shown in FIG. 3, in the same manner as in the case of FIG. 1. Under this condition, if a body 5 to be detected or examined such as a yarn, thread, strip or a substance partially permeable to air is present between nozzles 1 and 4, the ejected air streams impact against the front and rear surfaces of the body which acts as a shield, as shown in FIG. 4, with the position of impact being shifted toward the nozzle 4 as shown by dotted lines. Thus, the back pressure in the air micrometer and fluid pressure signal B disappear. However, in the absence of the body, the condition is restored to that shown in FIG. 3, thus producing fluid pressure signal B.

Figure 10:
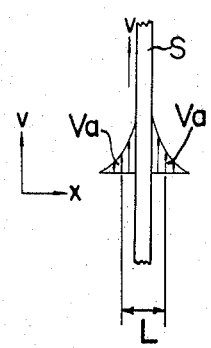
FIG. 10 is a diagram to illustrate the flow of air around a thread moving at a high speed.

As previously explained, the absence of the body can be converted to a fluid pressure signal by means of an opposed nozzle type detector defined by the nozzle and air micrometer. However, no detection can be effective when the body to be examined is extremely thin as regards the diameter of the detector nozzle such as, for example, filaments, yarns etc. Moreover, it is extremely difficult to machine the diameter of the detector nozzle to be thinner in correspondence to the facing nozzle diameter. To solve this problem, it was conceived by the applicants to cause the threads, yarns, etc. to be examined to run at high speed so that the column of air accompanying the running material is utilized for detecting the conditions of the materials. In a dynamic condition in which the threads, yarn, etc. are running at high speed, the air which embraces the runnng material also runs therewith whereby a low pattern of the air stream (velocity distribution) is considered to be developed. Although this velocity distribution is variable in accordance with the running speed, thickness and surface conditions of hte materials to be examined, it may be considered that such accompanying air stream is more or less present under any condition of the material. Hence, when the yarns, etc. and the air stream accompanying the same are to be detected by an opposed nozzle type detector, if the exit pressure of fluid from the opposed type detector is weak, a certain flow velocity V$a$ or more is detected and as a consequence a wide detection area is realized as shown in FIGURE 10. However, when the fluid pressure becomes high, the column of the accompanying air stream is destroyed so that detection of the abnormal conditions becomes impossible. In other words, the fluid pressure from the opposed nozzle type detector and the running speed of the material to be examined constitute a function for determining the apparent thickness L of the material. In this situation, the presence or absence of the material having a thin diameter such as threads, yarns, etc. can be detected by utilizing this apparent thickness of the material created by the accompanying air stream.

Accordingly, it is possible to detect the presence or absence of the linear materials by the presence or absence of the back pressure. By incorporating this opposed nozzle type detector into the detecting mechanism shown in FIG. 1, it is possible to detect an abnormal condition or breakage of a thread wire or like continuous materials.

In lieu of deriving a fluid pressure signal B out of a back pressure type air micrometer having a nozzle, a different type of opposed nozzle type detector using an output load of a load sensitive pressure logical element can be employed. FIGURE 5 illustrates such a modification in which one of two output ends of a Y-shaped fluid pressure controlled element 6 constitutes a nozzle for one end of the opposed nozzle type detector, and is disposed coaxially in confrontation with a third nozzle. The other output end of the two is used for a fluid pressure signal B so that a detector having the same function as that of the opposed nozzle type detector including back pressure type air micrometer can be provided and the presence or absence of a body to be examined can be converted to a fluid pressure signal. In case the diameter of the material filament to be examined is extremely thin in comparison to the diameter of the nozzle, the yarn is caused to run at a high speed for developing a column of an accompanying air stream surrounding the material thus detecting the apparent thickness of the material as previously mentioned above.

Figure 7:
FIG. 7 is a cross-section taken along a line VII—VII in FIG. 6.

FIGS. 6 and 7 show a detector wherein air is ejected in the form of a cylinder. In this construction, air under pressure is introduced through an inlet port 8 at the center of a conduit 7 and ejected through opposite ends thereof. Any abnormal condition or breakage of a thread or a wire passing through conduit 7 causes a change in the pressure of the air flow at the exit ends of the conduit which can be applied to a fluid controlled system identical to that shown in FIG. 1 to detect such abnormal condition or breakage.

Figure 8:
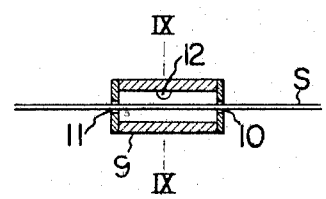
FIG. 8 is a longitudinal sectional view of a modification of the resistivity detector shown in FIGS. 6 and 7.
Figure 9:
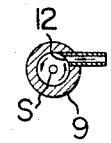
FIG. 9 is a cross-section taken along a line IX—IX in FIG. 8.

In the modified embodiment shown in FIGS. 8 and 9 conduit 9 takes the form of an elongated cylinder having openings 10 and 11 through both end walls adapted to pass a thread S to be detected and an air inlet port 12 at the center to admit air under pressure into conduit 9 in the tangential direction. Whirling motion of the air not only serves to maintain the thread along the axis of conduit 9 but also increases the flow resistance to air flow. The operation of this embodiment of the invention is identical to that of the embodiment shown in FIGS. 6 and 7.

In the air micrometer type detector or opposed nozzle type detector illustrated in FIGURES 1–5, the objects to be detected are limited to those of a flat shape such as a sheet or ribbon or the like or objects which are are linear and have a relatively thicker diameter with respect to the diameter of the nozzle. Such linear material is passed through the detecting assemblage at a high speed to develop a column of air stream therearound and the detection is effected with the increased apparent thickness of the actually thin thread, yarn etc. However, even when the apparent thickness is sufficiently increased, no detection can be realized if the column of the air stream surrounding the material leaves the axis connecting the orifice of the air micrometer and the coaxially opposed nozzle. The same thing can be stated in connection with detecting linear material of relatively large diameter.

Figure 11:
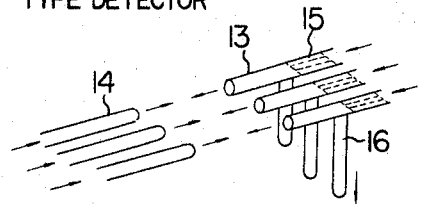
FIG. 11 is a perspective view of a detector assembly including multi-opposed nozzle type detectors.

The present invention, as will hereinafter be explained, relates to a device for detecting the breakage of yarns of thin diameter running at high speed and having a sidewise deflection. FIGURE 11 illustrates an embodiment for accomplishing this end in which a plurality of opposed nozzle type detectors for obtaining a wide sensitivity band for detection are arranged in parallel for defining a composite opposed nozzle type detector.

Figure 12:
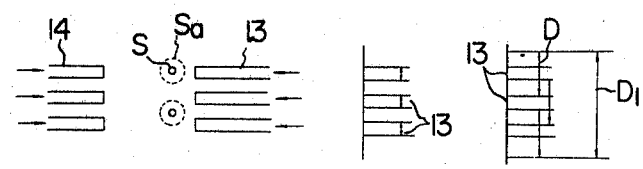
FIG. 12 is a diagram to explain the operation of the detector assembly shown in FIG. 11.

FIGURE 12 illustrates the detecting operation of this composite of opposed nozzle type detector. In FIGURE 11, the arrangement includes three pairs of opposed nozzle type detectors located at an interval of two mm. therebetween for example, and each includes a back pressure type air micrometer 13 provided with a throttle 15 and an opposed nozzle 14. Each detector is identical to that disclosed in FIGURES 2–4.

Referring to FIGURE 12, it will be understood that the thin filament S around which there exists columns Sa of accompanying air streams created by the high speed movement of the filaments passes by the nozzles 13 and 14 of a plurality of opposed nozzle type detectors. In this situation, if the thin filament S is running just on the axis of the coaxially opposed nozzles, the presence of the filaments is converted to a fluid pressure signal. Moreover, even when the filaments S leaves the axis of the opposed nozzles to the left or the right hand side, a part of the surrounding air layers is sensed by any adjacent nozzles so that a fluid pressure signal is developed as would be the case if the thin filaments existed on the axis. Accordingly, the opposed nozzle type detectors possess a broad band of sensitivity D for the detection with respect to the diameter of the nozzle. Similarly, other pairs of the opposed nozzle type detectors positioned in parallelism to each other also possess their own sensitivity band for the detection which is broader than the diameter of the opposed nozzles on the center of the axis thereof.

Assuming that these opposed nozzle type detectors are arranged in parallelism in the composite detector, the total sensitivity band for detection would be D1 as illustrated in FIGURE 12. In the FIGURE 11 embodiment in which three pairs of opposed nozzle type detectors are disposed, the material filament to be examined is caused to run at a rate of about 1,000 m./min. so that no dead zone or area is developed in the sensitivity band for the detection even if the nozzles were spaced at an interval of 2 mm.

The detection of the presence or absence of a thin filament having a sidewise deflection by means of the composite opposed nozzle type detector is achieved as follows:

When the material filament S to be examined is in the sensitivity band D of one of the opposed nozzle type detectors in this composite type apparatus, a low fluid pressure signal indicating the presence of a body to be examined is created from the detector and another signal indicating the absence of the body to be examined is generated from each one of the remaining opposed nozzle type detectors. Now, if the filament deflects sidewise in the subsequent instance to be positioned in the sensitivity band of the other opposed nozzle type detector, the detector where the body to be examined is positioned creates a signal to indicate a presence of the body and the remaining detector generate signals indicatings its absence. Accordingly, when a circuit is constructed in such a fashion that a NOR signal may be obtained from any of these opposed nozzle type detectors in the composite detecting apparatus, a signal of presence is always developed so far as at least one of the opposed nozzle type detectors detects the presence of the body to be examined. Furthermore, by arranging the nozzles in parallelism and an appropriate space not to create discontinuity between the adjacent sensitivity band for detection, i.e., not to create any dead zone or area therebetween, a broad band D1 of the composite detecting device can be achieved.

Hence the characteristic features of the composite opposed nozzle type detector of the present invention are:

That, by the column of the air stream developed around the thin filament at a high speed movement thereof, such thin filament can be detected as if it had a larger diameter of apparent thickness;

That, by arranging a plurality of opposed nozzle type detectors in parallelism to each other, even when the filament to be examined deflects sidewise from the axis of one of the coaxially opposed nozzles, the presence of the body can always be detected by taking OR or NOR of the signal; and That, a broadest possible sensitivity band for detectors can be realized by arranging the opposed nozzle type detectors at approxmiate space interval in consideration of the apparent thickness of the filament due to the column of accompanying air.

FIG. 13 is a diagram to show the relation between a detecting head or unit E including three pairs of detectors shown in FIG. 11 and a fluid pressure controlled system G, wherein fluid pressure signals responsive to the condition of threads are supplied to the fluid pressure controlled systems from three pairs of opposed nozzles of the detector head E. A source of compressed air F is provided to supply compressed air to detector head E and the system G. When one pair of nozzles detects the presence of the thread, that pair supplies a signal of pressure drop, while, when two pairs of nozzles detect the presence of threads, they supply signals of pressure drop although the magnitude of the signal depends upon the diameter and the travelling speed of the thread. System G comprises a NOT circuit or gate, a 3 fan-in OR-NOR circuit or gate and an amplifier circuit comprising a flip-flop circuit and is so constructed that said signals are respectively inverted by the NOT circuit and that on receiving at least one signal from the 3 fan-in OR-NOR circuit, the output becomes ON. In this case, the signal inlet port of the 3 fan-in OR-NOR circuit should have a diode characteristic. Fine solid line arrows show the flow of air stream when one of the three pairs of nozzles detects the presence of the thread (including the jet stream), the dotted line arrows show that when none of the three pairs detects and heavy solid line arrows show the flow of compressed air supplied by the source F. As shown in FIG. 13, the presence or absence of the thread to be detected as well as the breakage thereof is derived out as air streams or air pressure signals from separate exit ports of the final element of the circuit. Where two pairs of opposed nozzles are employed a 2 fan-in OR-NOR element is utilized, whereas for opposed nozzles of more than four pairs an OR-NOR element of more than 4 fan-ins is used.

FIGS. 14 and 15 illustrate two types of pressure switches adapted to convert ON, OFF air streams or air pressures supplied from two exit ports of the embodiment of the invention shown in FIG. 13. In the form shown in FIG. 14, the pressure switch comprises inlet ports 19 and 20 adapted to admit air streams from OFF and ON exit ports, respectively, and a diaphragm 18 which carries a movable contact 21 cooperating with a stationary contact 22 secured to the casing of the switch 17. Although not shown in the drawing, these contacts are included in a suitable electric signal circuit to produce electric signals. In the construction shown in FIG. 15, the air streams from OFF and ON exit ports are supplied to the opposite sides of a resilient flapper 25 which carries a movable contact 26 cooperating with a stationary contact 27.

FIG. 16 illustrates a pneumatic indicator which can be used instead of the pressure switches shown in FIGS. 14 and 15. The indicator shown in FIG. 16 comprises an enclosed cylinder 28 containing a floating ball 29, with the position thereof being determined by the relative pressure of ON, OFF and the air streams being supplied from the bottom and top ends, whereby the condition of the thread being examined is indicated.

FIGS. 17 and 18 show an integral assembly including a detector head 30, a fluid pressure controlled system 31 and a pressure switch 32. Detector head 30 is of the opposed nozzle type as shown in FIG. 11 and includes a plurality of pairs of parallel nozzles. Fluid pressure controlled system 31 comprises a plurality of laminated plates. One of the plates, for example, the lowermost plate 33 is provided with a plurality of engraved logical elements corresponding to those shown in FIG. 1. Other plates are provided with conduits to supply fluid pressure to the nozzles and various logical elements. Pressure switch 32 may be of the type shown in FIG. 14 or FIG. 15. The fluid pressure control system is constructed exactly like an integrated circuit with printed circuit networks utilized in the electronic industry. Although not shown in detail, it is to be understood that the integral assembly shown in FIGS. 17 and 18 completes a circuit similar to that shown in FIG. 13. Thus construction is very compact and is therefore suitable for mass production.

Hence, it will be clear that this invention provides a novel examining or detecting apparatus which is the equivalent to a combination of a photoelectric detector and an associated electronic logical circuit. Moreover, the apparatus can be used at high temperatures in a room containing dust or mist of vapor, so that it can replace photoelectric detectors in many applications under adverse conditions.

What is claimed is:

1. An apparatus for detecting abnormal conditions of yarns, filaments and like material possessing extremely thin diameter and operating at high speed, comprising opposed nozzle type detecting means for creating a fluid pressure signal responsive to the conditions of the materials to be examined, said detecting means including a back pressure type air micrometer having an orifice and a nozzle coaxially disposed in spaced relation thereto and in confrontation with said orifice, means for supplying fluid under pressure to said nozzle and air micrometer, means for locating said material to be examined between said nozzle and said air micrometer, means for causing said material to be examined to run at high speed thus creating a column of accompanying air around the material, and a fluidics system responsive to said fluid pressure signal, the pressure of the air streams from said confronting nozzles being adjusted to fix the plane of collision of the air streams to the side of the air micrometer for creating a backpressure thereby converting the presence or absence of the material to be examined into the fluid pressure signal.

2. An apparatus for detecting abnormal conditions of yarns, filaments, and like materials possessing extremely thin diameter and operating at high speed, comprising opposed nozzle type detecting means for creating a fluid pressure signal responsive to the conditions of the materials to be examined, said detecting means including a nozzle and a fluid pressure controlled logical element embodying an element switchable in accordance with a change of output load and having two output ends, one of said output ends being coaxially faced with said nozzle at a spaced interval and the other output end being employed for a fluid pressure signal, means for supplying fluid under pressure to said nozzle and said fluid pressure control system, means for locating materials to be examined between the nozzle and the output port of the fluid pressure controlled logical element, means for causing the materials to be examined to run at high speed thereby creating a column of acompanying air around the material, and a fluidics system responsive to said fluid pressure signal, with the pressure of the air streams from the confronting nozzle being adjusted for fixing the plane of collision of the air streams to the side of one output end of the fluid pressure control system thus converting the presence or absence of the material to be examined into the fluid pressure signal.

3. An apparatus for detecting abnormal conditions of yarn, filaments, and like materials possessing extremely thin diameter and operating at high speed, comprising opposed nozzle type detecting means for creating a fluid pressure signal in response to the condition of the material to be examined, said detecting means including a plurality of pairs of coaxially facing nozzles and backpressure type air micrometers each having an orifice, means for supplying fluid under pressure to the nozzles and air micrometers, means for locating material to be examined between the nozzle and the air mircrometer, means for causing the material to be examined to run at high speed thus creating a column of accompanying air around the material, and a fluidics system responsive to the fluid pressure signal, the plurality of pairs of the facing nozzles and air micrometers being arranged in parallelism to each other at an appropriate spaced interval for providing a broad continuous band of sensitivity for detection even when the material to be examined deviates sidewise and becomes off one pair of the facing nozzle and air micrometer, with the fluid pressure signal from each pair being taken for determining the presence or absence of the material to be examined.

4. The apparatus for detecting abnormal conditions of yarns, filaments, and like materials as claimed in claim 3, in which said opposed nozzle type detecting means include a plurality of pairs of facing nozzles and one output end of the fluid pressure controlled logical element utilizing the output load.

References Cited

UNITED STATES PATENTS

| | | | |
|---|---|---|---|
| 2,295,399 | 9/1942 | Hanna | 73—37.7 XR |
| 2,465,818 | 3/1949 | Richardson | 73—160 XR |
| 3,283,564 | 11/1966 | Biddison | 73—37.7 |
| 3,285,608 | 11/1966 | Lyman | 73—37.7 XR |
| 3,377,842 | 4/1968 | Pitney | 73—159 XR |
| 3,402,603 | 9/1968 | Hollister et al. | 73—159 |

LOUIS R. PRINCE, Primary Examiner

W. A. HENRY II, Assistant Examiner

U.S. Cl. X.R.

137—81.5; 73—37.7